Feb. 26, 1957 C. F. CAFOLLA ET AL 2,782,568
TRACER-POSITIONING APPARATUS
Filed Dec. 20, 1955 2 Sheets-Sheet 1
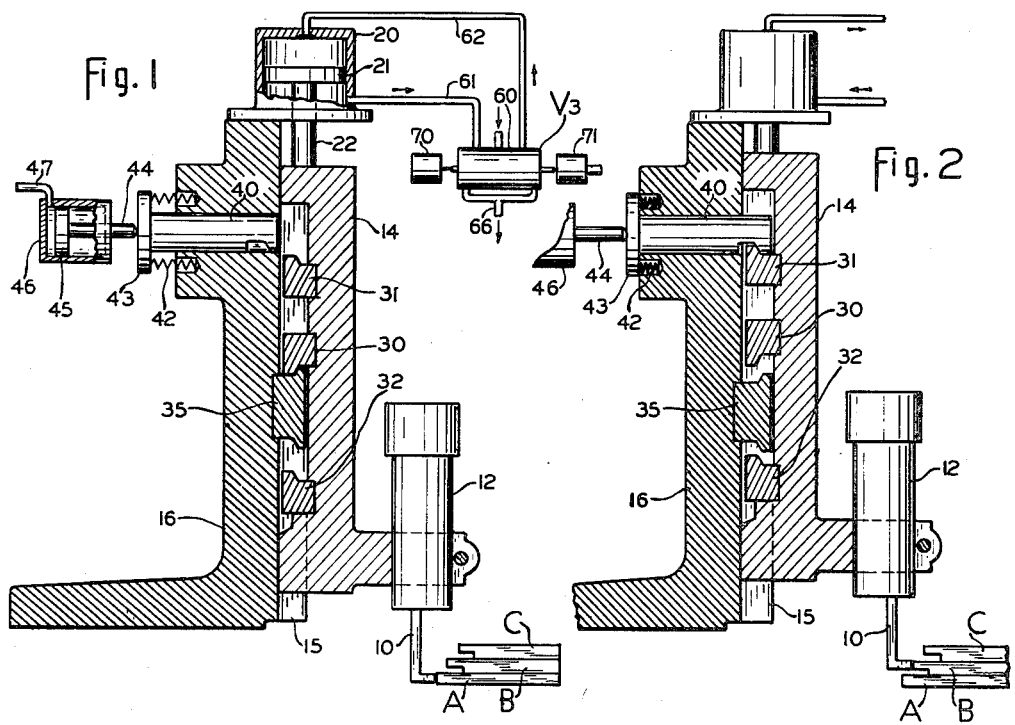
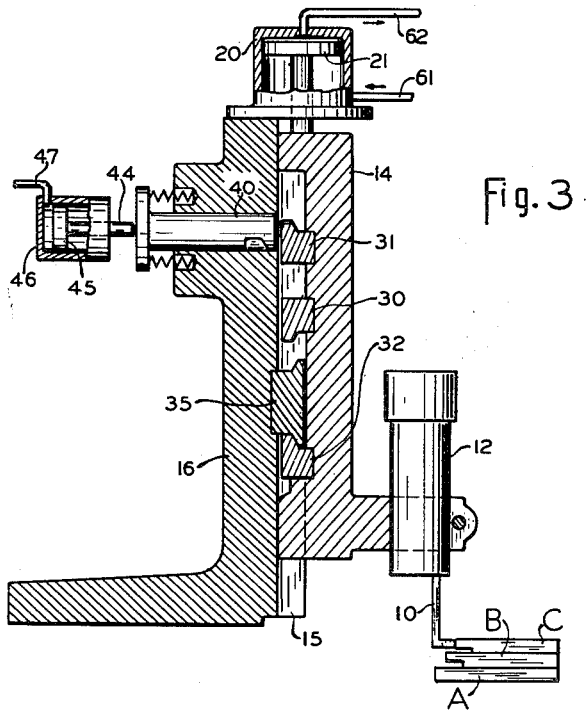
*INVENTOR.*
CONSTANTINE F. CAFOLLA.
BY  EDWIN R. SMITH
Chas. T. Hawley
ATT'Y.

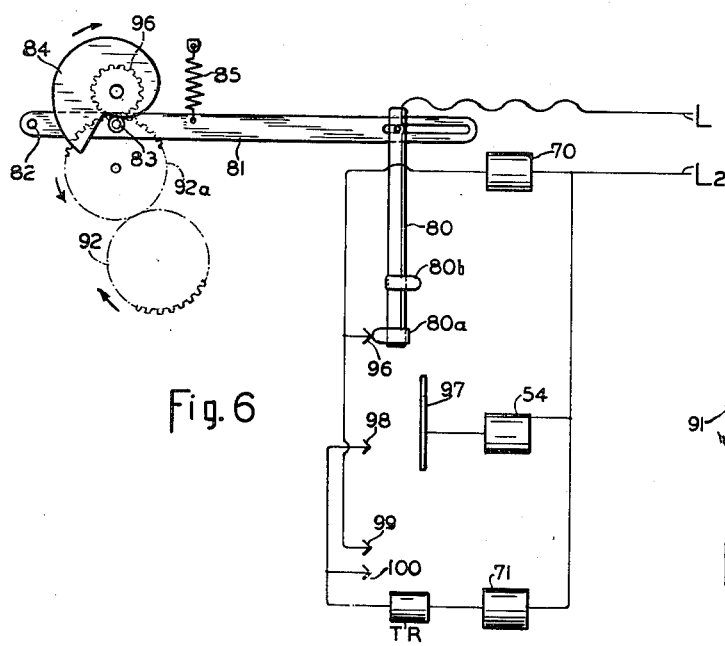
Fig. 6
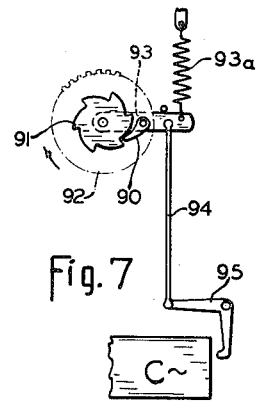
Fig. 7
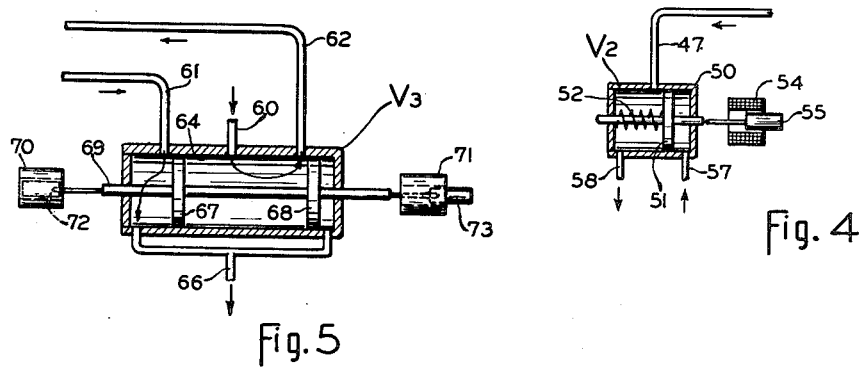
Fig. 5
Fig. 4

# United States Patent Office 2,782,568
Patented Feb. 26, 1957

2,782,568

TRACER-POSITIONING APPARATUS

Constantine F. Cafolla, Waterloo, and Edwin R. Smith, Seneca Falls, N. Y., assignors to Seneca Falls Machine Company, Seneca Falls, N. Y., a corporation of Massachusetts Application December 20, 1955, Serial No. 554,226

2 Claims. (Cl. 51—100)

This invention relates to a pattern-plate-and-tracer combination in a machine tool, by which the movements of a cutting tool or grinding wheel toward or away from a rotated workpiece may be continuously and accurately controlled.

Under certain conditions, it is desirable to provide a plurality of pattern plates to control successive operations, such as first, second and third cuts, and provision must be made for shifting the tracer to coact with a selected pattern plate.

It is the general object of this invention to provide improved means for automatically shifting the tracer to new operative positions in accordance with a pre-arranged schedule.

Our invention further relates to arrangements and combinations of parts which will be hereinafter described and more particularly pointed out in the appended claims.

In the present construction, three pattern plates and three successive operating positions of the tracer are provided, and positive fixed abutments determine the three operating positions.

A preferred form of the invention is shown in the drawings, in which

Fig. 1 is a sectional side elevation of the improved tracer-positioning means, and shown in its first operating position;

Fig. 2 shows the same parts in a second operating position;

Fig. 3 shows these parts in a third operating position;

Figs. 4 and 5 are sectional detail views of certain valve mechanism to be described;

Fig. 6 is a diagrammatic view of illustrative control mechanism; and

Fig. 7 is a diagrammatic view showing means by which the tool carriage may effect successive changes in the position of the tracer as different cutting operations are completed.

Referring to Fig. 1, we have shown a plurality of superposed templates A, B and C, each of which is adapted to coact with a tracer 10 associated with a hydraulic duplicator 12 which effects desired movements of the tool carriage toward or away from the work. The details of construction of the hydraulic duplicator 12 form no part of the present invention, and any suitable mechanism may be provided for moving the tool or grinding wheel toward or away from the work in response to movements of the tracer 10 and in the desired proportionate relation. For detailed descriptions of such mechanism, reference is made to the prior patents to Wilder No. 2,473,741 and Buckles No. 2,535,895.

The tracer 10 and duplicator 12 are mounted on a slide 14 associated with guideways 15 on a fixed bracket 16. A cylinder 20 is mounted on the bracket 16 and has a piston 21 connected by a piston rod 22 to the slide 14.

The slide 14 is provided with a plurality of lugs or stops 30, 31 and 32 fixed therein, and coacting with a double abutment 35 fixed in the stand 16 and with a stud or plunger 40 slidably mounted in said stand. The stud 40 is normally withdrawn by springs 42. The head 43 of the stud 40 abuts the end of a rod 44 attached to a piston 45 in a cylinder 46.

Oil is admitted to the cylinder 46 through a pipe 47 (Fig. 4) which connects to a single-acting valve structure V2 having a cylinder 50 in which a piston 51 is normally held in inoperative or exhaust position by a spring 52. The piston 51 may be moved to the left in Fig. 4 by a solenoid coil 54 acting on a solenoid plunger 55. Oil under pressure is supplied to the valve mechanism V2 through a pipe 57, and a pipe 58 provides exhaust. The control of the solenoid coil 54 will be hereinafter described.

The top cylinder 20 (Fig. 1) receives oil from a supply pipe 60 through a valve mechanism V3 (Fig. 5) and operating pipe connections 61 and 62. The pipes 60, 61 and 62 are connected with ports in a cylinder 64 in the valve mechanism V3, and exhaust ports in the opposite ends of the cylinder 64 are connected to an exhaust pipe 66 as shown.

Spaced pistons 67 and 68 (Fig. 5) on a piston rod 69 govern the flow of oil to and from the cylinder 20 under the control of solenoid coils 70 and 71, operating on associated solenoid plungers 72 and 73. When the solenoid coil 70 is energized, the double piston 67—68 will be pushed to the right to the positions shown in Fig. 5, with the oil supply pipe 60 connected through the pipe 62 to shift the piston 20 and slide 14 downward.

On the other hand, if the solenoid coil 70 is inactive and the solenoid coil 70 is energized, the double piston 67—68 will be pushed to the left-hand end of the cylinder 64, and the pipe 61 will be connected to the oil supply 60, while the pipe 62 is connected to the exhaust 66. Upward movement of the piston 21 and slide 14 will then take place.

In the operation of the positioning apparatus, oil is first admitted through the pipe 62 to depress the piston 21 and slide 14 and to cause the stop 30 to engage the upper side of the double fixed abutment 35 as shown in Fig. 1. This positions the tracer 10 opposite the lower template A.

When the operation controlled by the template A is completed, the solenoid coil 54 is energized to shift the piston 51 to the left in Fig. 4, thus supplying oil to the pipe 47 and causing the stud or plunger 40 to be shifted to the position shown in Fig. 2.

The valve V3 is then shifted by the solenoid coil 71 to admit oil through the pipe 61 and to raise the slide 14 to the position shown in Fig. 2, in which position the stop 31 engages the stud or plunger 40. This locates the tracer 10 opposite the second or middle template B as shown in Fig. 2. The second cutting or grinding operation is then performed.

Oil pressure is then shifted by the valve mechanism V3 to the upper end of the cylinder 20, depressing the slide 14, and the pressure in the pipe 47 is relieved by the valve mechanism V2, thus permitting the plunger 44 to return to its left-hand or inoperative position.

The connections of the cylinder 20 are then again reversed, admitting oil to the lower end of the cylinder and raising the slide 14 until the the stop 32 engages the lower side of the abutment 35, thus positioning the tracer 10 opposite the upper template C as shown in Fig. 3.

The third operation on the workpiece is then completed, after which the parts are returned to the position shown in Fig. 1.

Any suitable electrical apparatus may be provided for selectively energizing the solenoid coils 54, 70 and 71. In Figs. 6 and 7, we have shown certain simple illustrative apparatus by which the desired results may be easily and accurately attained.

In Fig. 6, we have shown a line wire L flexibly connected to the upper end of an insulated plunger 80 which may have a pin-and-slot connection to the outer end of a lever 81, pivoted at 82 and having a roll 83 engaged by a cam 84. A spring 85 holds the roll 83 against the cam.

The cam 84 may be successively advanced by 120° steps by a pawl 90 (Fig. 7) engaging a six-tooth ratchet 91 associated with a gear 92. The gear 92 acts through an idle gear 92a to engage a half-size gear 96 mounted with the cam 84. The cam 84 is thus in two-to-one relation to the ratchet 91.

The pawl 90 is mounted on a lever 93 connected by a link 94 with a bell crank 95 positioned for engagement by the end of the tool carriage C, as the return stroke of the carriage is completed at the end of the pattern-controlled cycle of tool operation. At each such engagement, the cam 84 will be rotated 120° and the plunger 80 will be shifted downward in successive advance movements. A spring 93a returns the feed lever 93.

In its initial or "up" position, a contact 80a on the plunger 80 engages a fixed contact 96, thus closing a circuit from the line wire L through the solenoid coil 70 to a second line wire L2. This positions the valve V3 as shown in Fig. 5, and causes the slide 14 to assume the position shown in Fig. 1, as determined by the upper face of the abutment 35.

On the completion of the ensuing first return movement of the tool carriage C, the cam 84 will be advanced 120° to further depress the plunger 80. This will cause the contact 80b thereof to engage an elongated contact 97 and thus close a circuit through the solenoid coil 54 in the valve mechanism V2. This will admit oil to the pipe 47 and will cause the stud 40 to be moved to operative position.

As this first advance movement of the plunger 80 is being completed, contact is also made by the contact 80a with a terminal 98 which is connected through the solenoid coil 71 to the line wire L2. This circuit may contain a timed relay TR. The slide 14 is then shifted upward to the position shown in Fig. 2, and the upward movement is limited by the stud or plunger 40.

On the completion of the second cutting operation and on the return of the carriage C to starting position, the cam 84 will be again advanced 120°, which will move the contact 80b down beyond the lower end of the contact 97, and which will cause the contact 80a to momentarily engage a contact 99 and immediately thereafter to engage a contact 100 in the timed relay circuit.

Engagement of the contact 80a with the contact 99 again completes a circuit through the solenoid coil 70, thus depressing the slide 14 and releasing the plunger 40. This momentary action is followed by the immediately successive engagement of the contact 80a with the contact 100, which completes a circuit through the solenoid coil 71 and shifts the slide 14 upward to the third position shown in Fig. 3, with the lug 32 engaging the under face of the double abutment 35.

On the completion of the third cutting or grinding operation, the cam 84 will be advanced to permit the roll 83, lever 81 and plunger 80 to be moved upward by the action of the spring 85 to the original starting position shown in Fig. 4.

It will thus appear that entirely automatic operation is provided by which the tracer 10 is successively placed in operative relation with the templates A, B and C, and whereby three different but successive pattern-controlled machine operations may be performed.

Having thus described our invention and the advantages thereof, we do not wish to be limited to the details herein disclosed, otherwise than as set forth in the claims, but what we claim is:

1. In a pattern-and-tracer control mechanism comprising a plurality of pattern plates and a single associated tracer, in combination, a tracer slide having three spaced lugs fixed thereon, a bracket for said slide having a double fixed abutment engageable by two of said lugs successively to determine two different operative positions of said slide and tracer, a third abutting member movable to and from engaging position with respect to the third lug on said slide, and selective means to move said third member to lug-engaging position.

2. The combination in a pattern-and-tracer control mechanism as set forth in claim 1 characterized in that said selective means is thereafter effective and operated to release said third member and permit a further movement of said slide in the same direction as on its first movement.

References Cited in the file of this patent

UNITED STATES PATENTS

| | | |
|---|---|---|
| 1,358,929 | Bragg | Nov. 16, 1920 |
| 1,791,479 | Silven | Feb. 3, 1931 |
| 2,420,547 | Lovely | May 13, 1947 |
| 2,473,741 | Wilder | June 21, 1949 |
| 2,489,533 | Levy | Nov. 29, 1949 |
| 2,535,895 | Buckles | Dec. 26, 1950 |